United States Patent [19]

Guyette et al.

[11] Patent Number: 4,699,027
[45] Date of Patent: Oct. 13, 1987

[54] CABLE STRIPPING APPARATUS

[75] Inventors: Raymond F. Guyette, Hayesville; William T. Wright, Murphy, both of N.C.

[73] Assignee: Litton Systems, Inc., Murphy, N.C.

[21] Appl. No.: 888,745

[22] Filed: Jul. 24, 1986

[51] Int. Cl.[4] ............................................ H02G 1/12
[52] U.S. Cl. .................................... 81/9.51; 29/426.4; 83/111
[58] Field of Search ............... 81/9.51, 9.41, 9.42, 81/9.4; 140/1; 29/426.4; 33 M; 83/111

[56] References Cited

U.S. PATENT DOCUMENTS

| | | | |
|---|---|---|---|
| 2,884,825 | 5/1959 | Eubanks | 81/9.51 |
| 2,886,995 | 5/1959 | Bach et al. | 81/9.51 |
| 2,920,513 | 1/1960 | Baird et al. | 81/9.51 |
| 3,309,948 | 3/1967 | Falken | 81/9.51 |
| 3,316,781 | 5/1967 | Bignell et al. | 81/9.51 |
| 3,364,801 | 1/1968 | Johnston | 81/9.51 |
| 3,368,428 | 2/1968 | Gudmestad | 81/9.51 |
| 3,385,139 | 5/1968 | LLoyd | 81/9.51 |
| 3,612,111 | 10/1971 | Meyer | 81/9.51 |
| 4,275,619 | 6/1981 | Shimizu | 81/9.51 |

Primary Examiner—Frederick R. Schmidt
Assistant Examiner—Maurina Rachuba
Attorney, Agent, or Firm—Brian L. Ribando

[57] ABSTRACT

A cable cutting and stripping machine has a primary and a secondary cable drive mechanism, both driven by stepper motors. The primary drive mechanism includes two driven gripper belts which contact the cable along the top and bottom surface to eliminate slippage between the belts and the cable. Stripper blades cut through the cable insulation and are driven in one direction along the cable length to strip the right end of a cable, and in the opposite direction to strip the left end of the cable. A programmable machine controller controls all operations of the machine including feeding preselected lengths of cable through the machine by controlling the stepper motors. The programmable machine controller also controls actuation of the stripper blades, a cutting blade, and various clamps by controlling a number of air cylinders.

10 Claims, 6 Drawing Figures

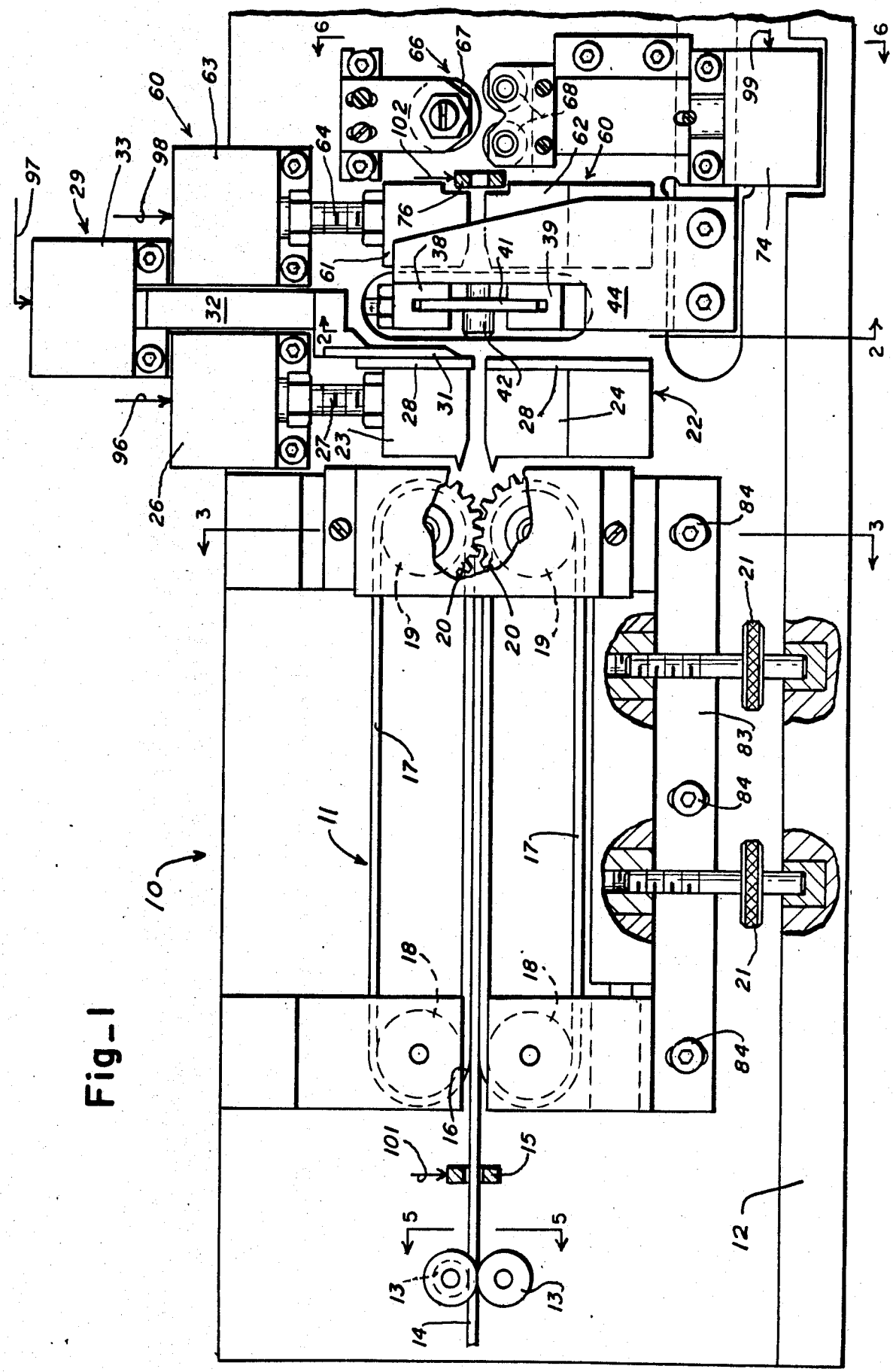
Fig_1

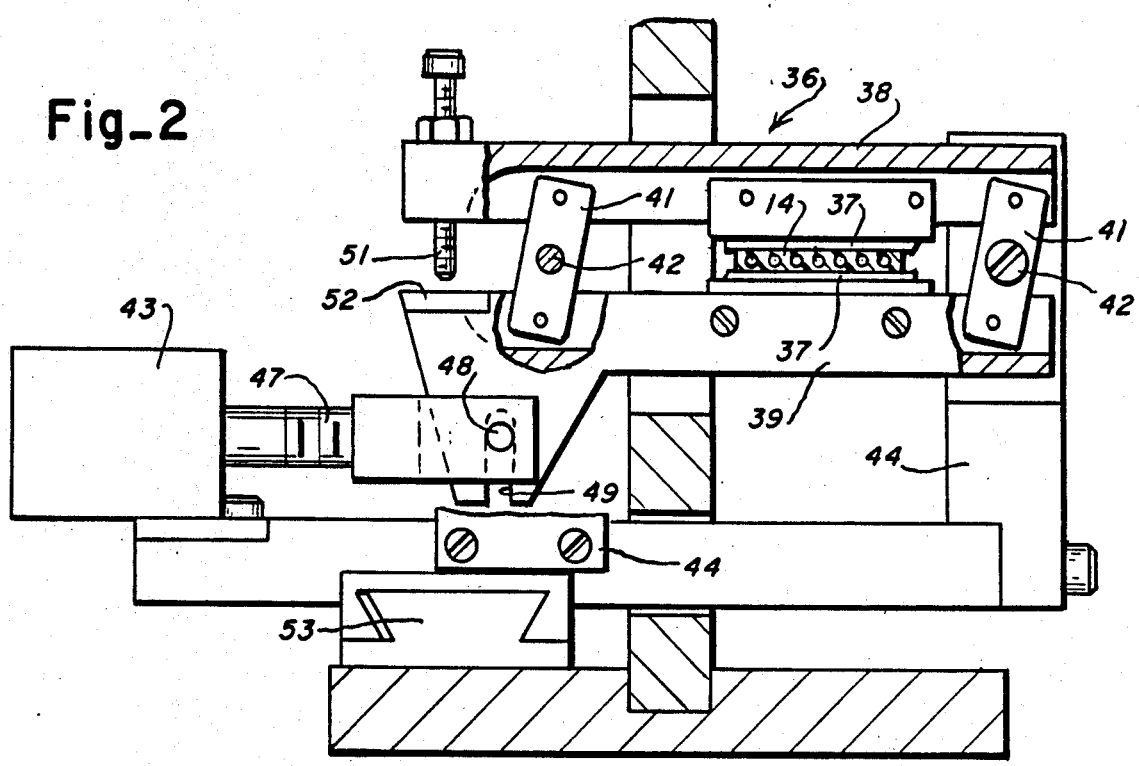
Fig_2
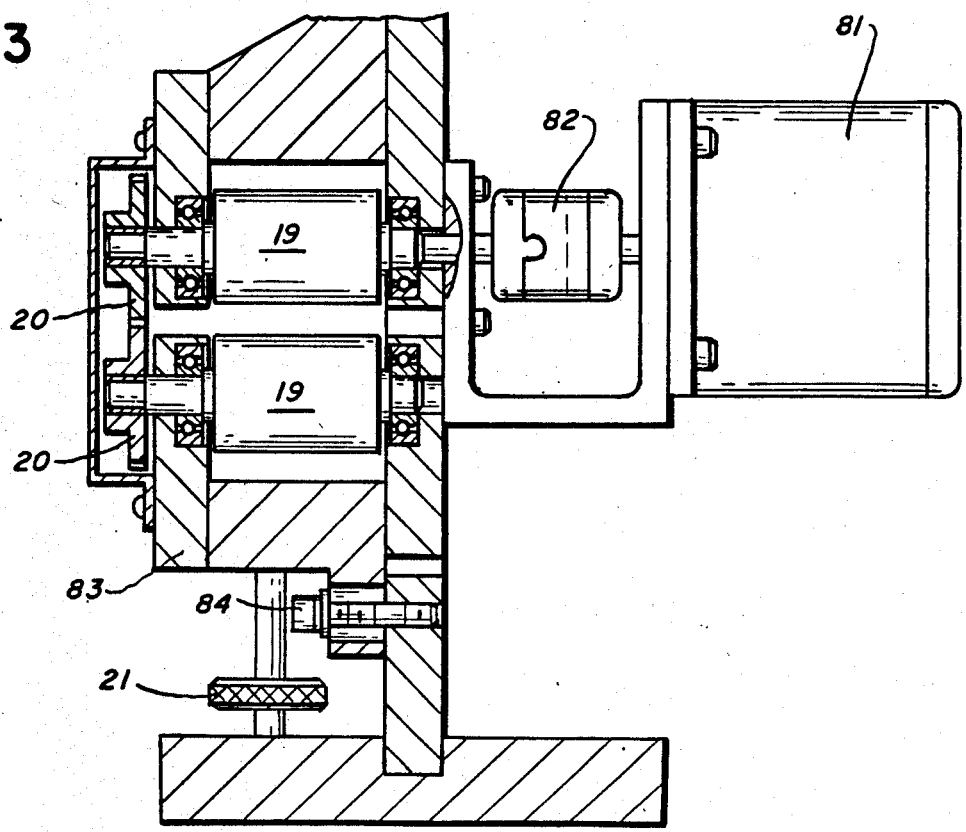
Fig_3

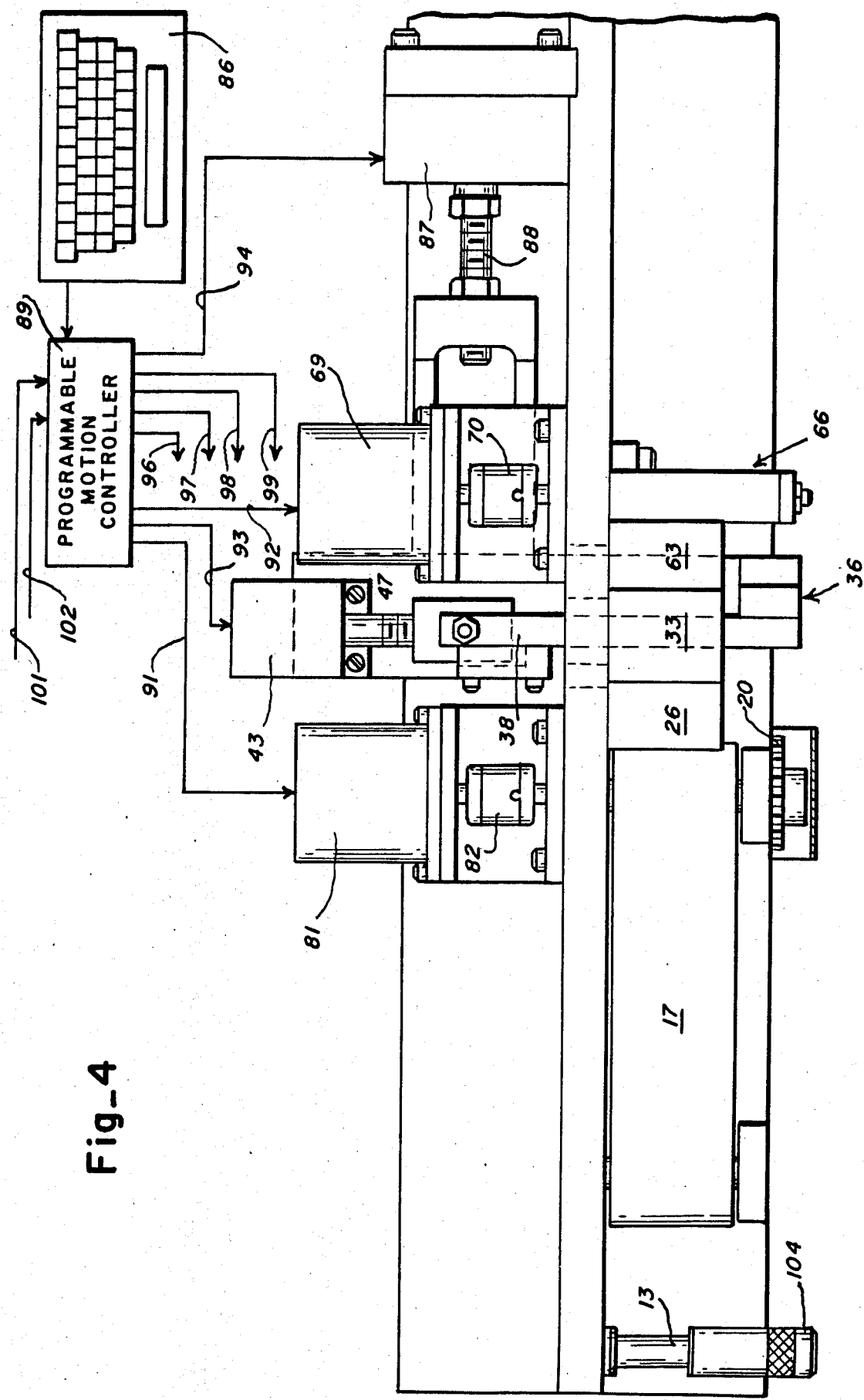
Fig._4

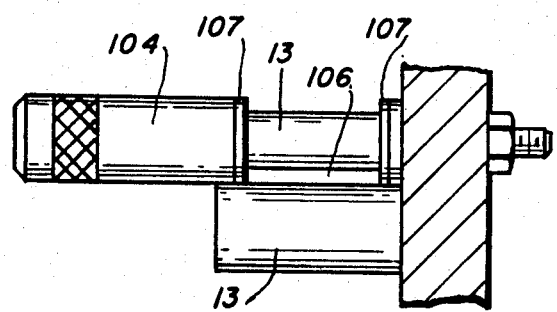
Fig_5
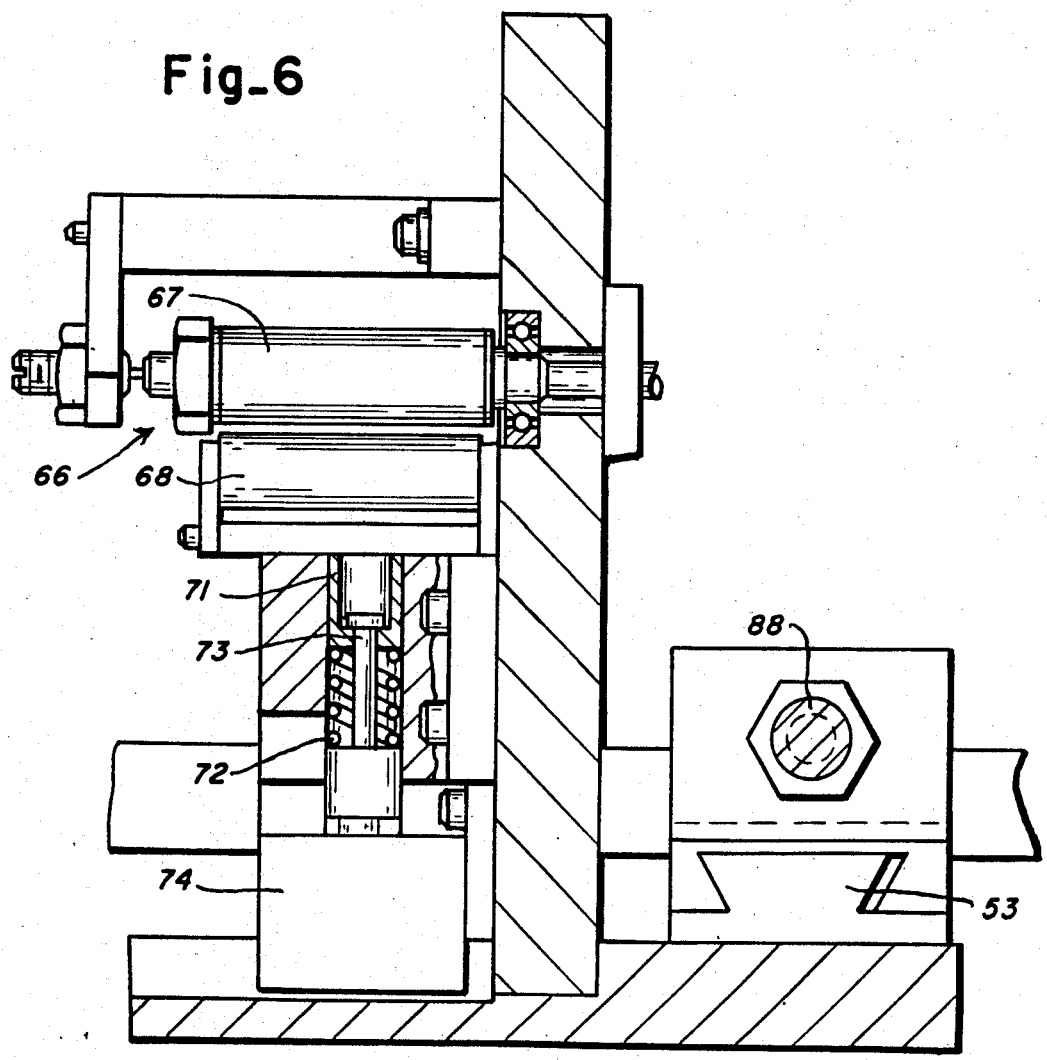
Fig_6

CABLE STRIPPING APPARATUS

BACKGROUND OF THE INVENTION

This invention relates to a machine for cutting electrical cable to a desired length and stripping the insulation from one or both ends of the cut piece of the cable.

Wire cutting and stripping machines are well known in the art. Such machines comprise a means for feeding a length of wire into the machine, for measuring the length of wire, for cutting the wire, and for stripping the insulation from the end of the wire. Prior art machines are complex mechanisms utilizing encoding devices on the cable feeding means to measure wire length, and employ cams, levers, and switches to control the many operations of the machine. As a result, prior art machines are expensive, complicated, and prone to malfunction. Because of slippage between the wire and the wire feeding mechanism, the length of wire cut by prior art machines and the length of the stripped wire ends, often was not accurate. Also, known wire machines are not capable of cutting and stripping flat multiconductor or ribbon cable.

It would thus be desirable to provide a cable cutting and stripping machine without the above mentioned drawbacks.

SUMMARY AND OBJECTS OF THE INVENTION

According to the invention, a cable cutting and stripping machine is controlled by a programmable machine controller (PMC). The PMC controls two stepper motors which measure cable length, and the length of insulation to be stripped from the cable ends, to an accuracy of 0.010 inch. The PMC also controls the sequence of operation of a number of air cylinders which operate mechanisms to cut the cable, clamp the cable within the machine, and strip the cable ends. Thus, the PMC eliminates the cams, levers, and switches normally found in prior art machines. The cable cutting and stripping blades are elongated and flat to accommodate flat ribbon cable. Additionally, two driven gripper belts are used to feed cable into and through the machine. The two driven gripper belts eliminate slippage between the belts and the cable thereby allowing lengths of cable to be accurately measured by controlling the drive to the gripper belts.

It is thus an object of the invention to provide a cable cutting and stripping machine in which a programmable machine controller (PMC) controls all operations of the machine.

• It is another object of the invention to provide a cable cutting and stripping machine in which a PMC controls stepper motors which measure cable length and the length of the stripped cable ends.

It is another object of the invention to provide a cable cutting and stripping machine in which a PMC controls a plurality of air cylinders which power the cutting and stripping mechanisms of the machine.

It is still another object of the invention to provide a cable cutting and stripping machine which is able to accommodate flat multiconductor ribbon cable.

These and other objects of the invention will be apparent from the following detailed description in which reference numerals used throughout the description designate like or corresponding parts on the drawing figures.

BRIEF DESCRIPTION OF THE DRAWINGS

FIG. 1 is a front view of a cable cutting and stripping machine according to the invention.

FIG. 2 is a sectional view taken along line 2—2 of FIG. 1 showing the cable stripping mechanism.

FIG. 3 is a sectional view taken along line 3—3 of FIG. 1 showing drive pulleys and the drive motor therefor.

FIG. 4 is a plan view of the cable cutting and stripping machine of the invention.

FIG. 5 is a sectional view taken along line 5—5 of FIG. 1 showing the guide rollers used on the cable cutting and stripping machine of the invention.

FIG. 6 is a sectional view taken along line 6—6 of FIG. 1 showing the secondary cable drive mechanism of the invention.

DESCRIPTION OF THE PREFERRED EMBODIMENT

Turning now to the drawing figures, there is shown in FIG. 1, a cable cutting and stripping machine generally designated by the reference numeral 10. The machine includes a frame 12 on which the various mechanisms which comprise the machine are mounted. A pair of guide rollers 13 best seen in FIG. 5, guide a continuous length of electrical cable 14 from a cable supply roll (not shown) to a primary cable drive mechanism 11. The cable 14 as shown on the drawings comprises flat ribbon type cable, but round wire may also be processed by the machine. A first fiber optic sensor 15 comprising a light source and a detector is located between the guide rollers 13 and the primary drive mechanism 11. The primary cable drive mechanism 11 comprises a pair of gripper belts 17 formed of neoprene or other tactile resilient material which are supported by a pair of idler pulleys 18 to form a nip 16 at one end, and a pair of drive pulleys 19 at the other end. The position of both idler pulleys 18 is adjustable horizontally to provide the proper tension on the belts 17. The vertical position of the lower idler pulley 18 and of the lower drive pulley 19 is adjustable by means of the thumbwheels 21 to provide a line of contact along the two belts 17 between the idler pulleys 18 and the drive pulleys 19 in order to engage and feed a cable 14 through the machine. The drive rollers 19 are driven through a pair of spur gears 20 as more fully explained below in conjunction with FIG. 3.

A first clamp mechanism 22 comprising a movable clamp 23 and a lower support 24 is positioned adjacent the exit end of the gripper belts 17. The movable clamp 23 is coupled to a first clamp drive cylinder 26 by a threaded rod 27, and both the movable clamp 23 and the lower support 24 are wide enough to accommodate the widest cable 14 which will be processed by the machine.

Adjacent the first clamp mechanism 22 is a pair of blade guides 28. The blade guides 28 cooperate with a cutter mechanism 29 comprising a reciprocating blade 31, a drive link 32, and a blade drive cylinder 33.

Adjacent the cutter mechanism 29 is a stripper mechanism 36, best seen in FIG. 2. The stripper mechanism 36 comprises a pair of elongated, flat stripper blades 37 which are mounted on a pair of stripper arms 38 and 39. The stripper arms are each supported by links 41 which are attached by pivots 42 to upstanding supports 44. The lower arm 39 is driven by an air cylinder 43 through a drive link 47 and a pin 48 mounted on the end of the drive link 47. The pin 48 engages a slot 49 in the lower stripper arm 39. An adjustable threaded stop 51 which is mounted on the upper stripper arm 38 contacts a stop block 52 on the lower stripper arm 39 to limit the approach of the stripper blades 37 toward one another. The stripper blades remain parallel during opening and closing so that the insulation on a flat ribbon cable can be severed without cutting the electrical conductors within a ribbon cable. The entire stripper mechanism 36 is mounted on a dove-tail slide 53 which permits reciprocating motion of the stripper mechanism 36 along the path of the cable 14.

Returning now to FIG. 1, adjacent the stripper mechanism 36 is a second clamp mechanism 60 comprising a movable clamp 61 and a lower support 62. The movable clamp 61 is coupled to a second clamp drive cylinder 63 by a threaded rod 64.

Adjacent the second clamp mechanism 70 is a secondary cable drive mechanism 66 comprising a drive roller 67 and two opposed idler rollers 68. The drive roller 67 is rotated by a stepper motor 69, best seen in FIGS. 4 and 6, and the idler rollers 68 are mounted on a connecting rod 71 best seen in FIG. 6. The idler rollers 68 are biased toward the drive roller 67 by a spring 72 and may be pulled away from the drive roller 67 by a pin 73 which is driven by an air cylinder 74.

As shown in FIG. 1, a second fiber optic sensor 76 comprising a light source and a detector is positioned between the second clamp mechanism 60 and the secondary cable drive mechanism 66.

Turning now to FIG. 3, a portion of the primary drive mechanism 11 can be seen in greater detail. The upper drive pulley 19 is driven by a stepper motor 81 acting through a drive coupling 82. A spur gear 20 is coupled to the shaft of each of the drive pulleys 19. The two spur gears 20 mesh with one another so that the rotation of the upper drive pulley 19 causes an equal rotation of the lower drive pulley 19. This insures that the two drive belts 17 (not shown) are driven in synchronism, and eliminates the need for pressure pads along the belt length to minimize slippage between the gripper belts 17 and the cable 14. Since pressure pads rub against the gripper belt, they retard the speed of the belts and increase the load on the belt drive motor. Thus, the elimination of the pressure pads along the belts results in a more efficient machine.

The lower drive pulley 19 and the lower idler pulley 18 are mounted in a pulley frame 83 the vertical position of which may be adjusted by the thumbwheels 21 to compensate for the thickness of the drive belts 17 and of the cable 14 being driven by the belts. The range of adjustment is not enough, however, to allow the spur gears 20 to separate from one another. Once the vertical position of the lower drive belt 17 has been adjusted, the pulley frame 83 can be locked in place by means of the lock bolts 84.

FIG. 4 is a plan view of a portion of the cable cutting and stripping machine showing the location of the first stepper motor 81 which drives the drive pulley 19 and the second stepper motor 69 which drives the drive roller 67 of the secondary drive mechanism 66 through a drive coupling 70. Also shown is the air cylinder 43 which drives the stripper arms 38 and 39 and the air cylinder 87 which reciprocates the stripper mechanism along the path of the cable 14 on the dove-tail slide 53 by means of the drawbar 88.

A programmable motion controller (PMC) 89 is used to control the operation of the wire cutting and stripping machine 10. The PMC 89 is coupled by control lines 91 and 92 to the stepper motors 81 and 69, respectively, and by control lines 93 and 94 to the air cylinders 43 and 87, respectively. The PMC 89 is coupled by control lines 96, 97, 98, and 99 to the air cylinders 26, 33, 63, and 74, respectively, best seen in FIG. 1. The fiber optic sensors 15 and 76 are coupled to the PMC by means of control lines 101 and 102, respectively. The PMC 89 receives instructions from an operator controlled keyboard terminal 86. In practice, the PMC may comprise a DPF-37 motion controller available from Clifton Precision in Murphy, N.C. The keyboard terminal 86 may comprise a Model 100 Radio Shack computer.

FIG. 5 shows a side view of the guide rollers 13 in greater detail. A handle 104 extends from the upper guide roller 13 and can be used to adjust the width of the gap 106 between the two washers 107 according to the width of the cable being fed through the machine.

MODE OF OPERATION OF THE PREFERRED EMBODIMENT

The PMC 89 controls the operation of the wire cutting and stripping machine 10. The keyboard terminal 86 is used to program the PMC 89 regarding the length of cable pieces to be cut from the continuous length of cable, which ends of the cut cable are to be stripped, and the amount of insulation to be stripped from the cable. Once this information has been programmed into the PMC, the machine functions in an automatic mode to cut a preselected number of measured cable pieces and to strip one or both ends of each piece.

In order to begin a cable cutting and stripping operation, the stepper motor 81 drives the gripper belts 17 through the drive pulleys 19 to advance a short length of cable past the knife blade 31. The first clamp mechanism 21 closes and the knife blade lowers to cut the cable 14, trimming the right end of the cable in preparation for a production run. The knife blade 31 is then raised to its rest position, and the first clamp mechanism 21 opens.

The stepper motor 81 is then used to feed the right end of the newly trimmed cable end into the stripper mechanism 36. Once the proper length of cable has been fed through the stripper blades 37, the first clamp 22 closes, the stripper blades 37 close, and the air cylinder 87 draws the stripper mechanism 36 to the right. This strips the insulation from the right end of the cable 14. It will be understood that the threaded stop 51 is preferably adjusted so that the stripper blades 37 close only enough to cut through the insulation above and below the conductors which comprise the cable 14. The movement of the stripper mechanism 36 to the right will tear the insulation from the right end of the cable 14 and slide the torn insulation off of the conductors in the cable.

After the right end of the cable has been stripped, the stripper blades 37 open, the first clamp 22 opens, and the stepper motor 81 feeds the cable through the machine until the desired length of cable has passed through the cutter mechanism 29. The first clamp 22 closes and at the same time the air cylinder 74 releases the pin 73 to allow the spring 72 to raise the rollers 68 and press the cable 14 into contact with the drive roller 67. The blade 31 lowers to cut the cable. The PMC then causes the stepper motor 69 to rotate the drive roller 67 to advance the cable until only the length of cable to be stripped remains on the left side of the stripper blades 37. The second clamp mechanism 60 then closes, the stripper blades 37 close on the cable 14, and the air cylinder 87 forces the blades to the left to strip the left end of the cable. The stripper blades 37 then open, the second clamp 60 opens, and the drive roller 67 ejects the severed and stripped cable piece from the machine.

The above operation is automatically repeated until the desired number of cable pieces have been cut and stripped by the machine 10. Because stepper motors 81 and 61 are used to power the primary and secondary cable drive mechanisms, the amount of cable fed through the machine may be precisely controlled by the PMC 89 by application of the proper number of drive pulses to the stepper motors in a manner which is well known to those skilled in the art. Using this arrangement, the length of cable which is measured and cut, and the length of the stripped end of the cable, can be accurate to within 0.010 inch. The accuracy of the machine is also enhanced by the use of a drive pulley 18 for each drive belt 17, whereby sufficient force is generated by the drive belts 17 to pull the cable 14 from a supply roll and feed the cable through the machine 10 without slippage between the belts 17 and the cable. Once the cable 14 has been cut by the blade 31, the resulting cut length of cable may be easily fed through the stripper blades 37 by the drive roller 67 without slippage between the roller 67 and the cut cable piece.

The first and second clamp mechanisms 22 and 60 also enhance the operation of the machine by clamping the cable 14 in the machine so that a cutting or stripping operation can be accurately performed. It will be noted that the present invention completely eliminates the need for cams, levers, and switches in order to sequence the various operations of the machine. All mechanisms are powered either by the two stepper motors 81 and 69, or by the air cylinders which provide a simple push-pull motion. This arrangement provides a machine which utilizes a minimum of moving parts, and is rugged and reliable.

The first fiber optic sensor 15 senses the presence of cable between the guide rollers 13 and the nip 16 of the gripper belts 17, and will signal the PMC 89 to stop the machine if the supply of cable from the supply roll is exhausted. The second fiber optic sensor 76 detects a jam in the machine by sensing that the drive roller 67 is incapable of clearing the cable from the path between the second clamp mechanism 60 and the secondary drive mechanism 66. Once a jam has been detected, the PMC 89 will stop the machine.

Because the operation of the machine is fully automatic once the cable piece length and stripped end length has been prograamed, the machine is able to cut and strip up to 5,000 pieces of cable per hour.

Having thus described the invention, various alterations and modifications thereof will be apparent to those skilled in the art, which modifications and alterations are intended to be within the scope of the invention as defined by the appended claims.

What is claimed is:

1. A machine for cutting and stripping the insulation from the end of wire or flat ribbon cable, the machine comprising:
   a primary cable drive mechanism for feeding cable into the machine comprising:
      a pair of opposed gripper belts;
      a drive pulley for each of the gripper belts,
      a first stepper motor for rotating the drive pulleys; and
      means for maintaining the drive pulleys rotating in synchronism;
   a first clamp mechanism for clamping the cable in the machine;
   a cutter mechanism for cutting the cable into discrete lengths,
   a stripper mechanism for stripping the insulation from one or both ends of the discrete lengths of cable, the stripper mechanism comprising:
      a pair of movable stripper arms;
      a pair of stripper blades mounted one each on the pair of stripper arms;
      a pair of links connected to the stripper arms and pivotably mounted to a support means;
      a drive link coupled to one of the stripper arms;
      means for reciprocating the drive link to close and open the stripper blades with respect to one another; and
      means for driving the stripper mechanism along the cable length to strip insulation from the cable;
   a second clamp mechanism for clamping the cable in the machine; and
   a secondary cable drive mechanism comprising:
      a drive roller and a pair of opposed idler rollers;
      a second stepper motor coupled to the drive roller;
      means for causing the idler rollers to bias a cable against the drive roller; and
   a programmable machine controller (PMC) coupled to the first stepper motor whereby the length of the cut cable piece and the amount of insulation stripped from the right cable end may be controlled, wherein the PMC is also coupled to the second stepper motor, whereby the amount of insulation stripped from the left cable end may be controlled.

2. The cable cutting and stripping machine of claim 1 further comprising:
   a pair of guide rollers spaced from the primary cable drive mechanism for guiding cable into the primary cable drive mechanism;
   a first fiber optic sensor positioned between the guide rollers and primary cable drive mechanism for sensing the presence of a cable between the guide rollers and the primary cable drive mechanism; and
   coupling means between the first fiber optic sensor and the PMC, whereby the absence of cable between the guide rollers and the primary cable drive mechanism causes the PMC to stop the machine.

3. The cable cutting and stripping machine of claim 2 wherein the secondary cable drive mechanism comprises a means for ejecting a cut cable piece from the machine.

4. The cable cutting and stripping apparatus of claim 3 further comprising:
   a second fiber optic sensor means positioned between the second clamp mechanism and the secondary cable drive mechanism for sensing the ability of the secondary cable drive mechanism to eject a cable from the space between the second clamp mechanism and the secondary cable drive mechanism; and
   coupling means between the second fiber optic sensor and the PMC, whereby the inability of the secondary cable drive mechanism to eject a cable from the space between the second clamp mechanism and the secondary drive mechanism causes the PMC to stop the machine.

5. The cable cutting and stripping apparatus of claim 4 further comprising:
   a pair of spur gears meshed with one another and coupled one each to the pair of drive pulleys, the pair of spur gears comprising the means for maintaining the drive pulleys rotating on synchronism.

6. The cable cutting and stripping apparatus of claim 5 further comprising:
   a pair of idler pulleys spaced from the drive pulleys for supporting the opposed gripper belts; and
   a continuous line of contact formed by the two gripper belts between the idler pulleys and the drive pulleys, whereby slippage between the gripper belts and the cable fed into the machine by the gripper belts is eliminated.

7. The cable cutting and stripping apparatus of claim 6 further comprising:
   adjustable stop means for limiting the closing of the stripper blades with respect to one another.

8. The cable cutting and stripping machine of claim 6 wherein the means for driving the stripper mechanism along the cable length to strip insulation from the cable displaces the stripper mechanism to the right from a rest position to strip insulation from the right end of the cable and thereafter displaces the stripper mechanism to the left, returning the stripper mechanism to the rest position, to strip insulation from the left end of the cut cable piece.

9. The cable cutting and stripping apparatus of claim 2 further comprising:
   a pair of spaced washers comprising one of the guide rollers; and
   means for changing the spacing between the washers, whereby a gap formed between the two washers may be adjusted to accommodate various width cables fed into the machine.

10. The cable cutting and stripping apparatus of claim 5 further comprising:
   a spring comprising the means for causing the idler rollers to bias a cable against the drive roller; and
   means for drawing the idler rollers away from the drive roller to disengage the drive roller from the cable.

* * * * *